United States Patent Office 2,791,671
Patented May 7, 1957

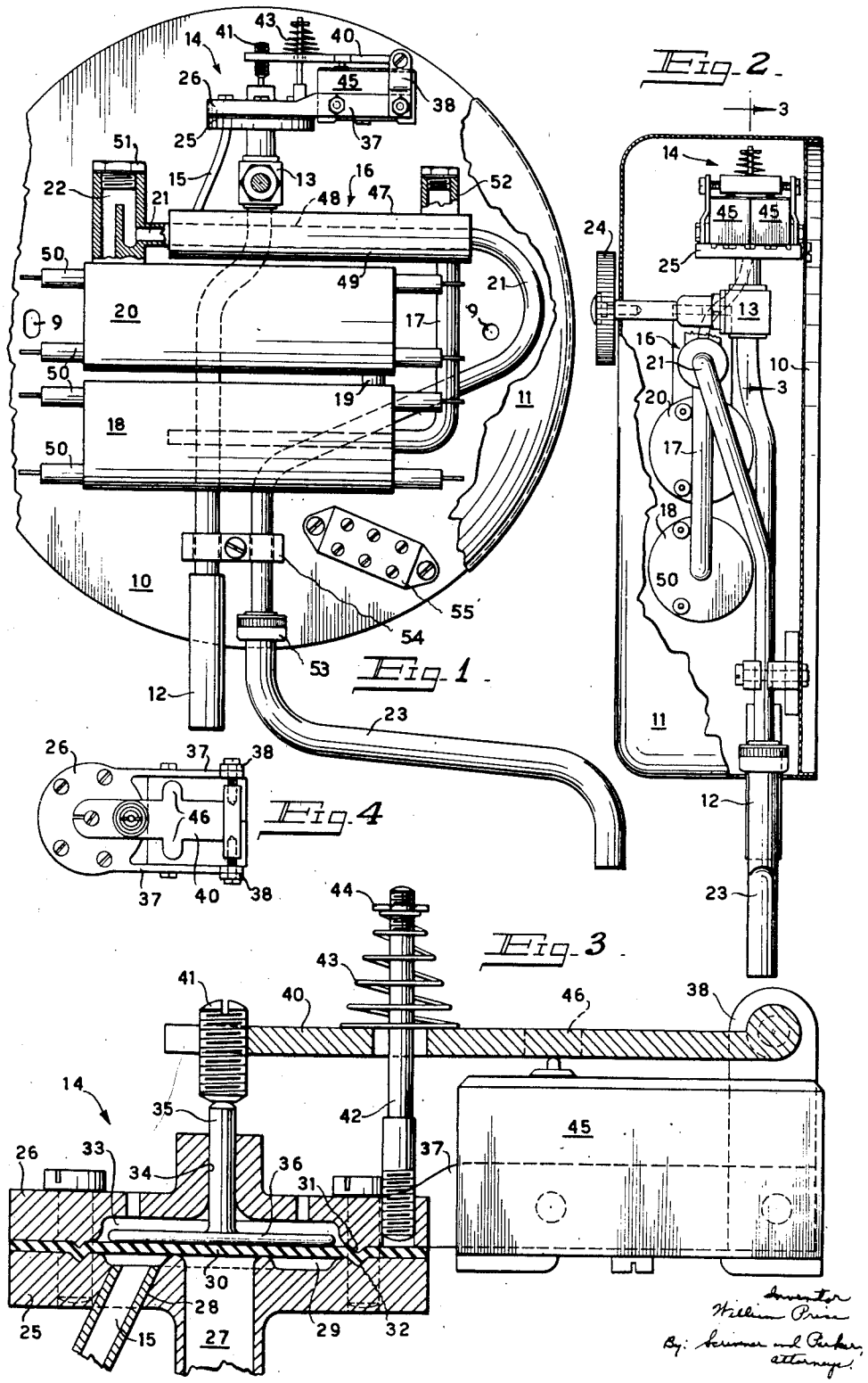

2,791,671
ELECTRIC WATER HEATERS
William Price, Warwickshire, England

Application January 17, 1956, Serial No. 559,739

Claims priority, application Great Britain January 20, 1955

14 Claims. (Cl. 219—39)

This invention relates to electric water heaters of the so-called "instantaneous" type that is to say in which current is supplied to the heating element or elements only while water is being drawn off. In order to produce hot water at a high temperature very quickly it is necessary for the overall thermal capacity of the heating unit including the water it contains to be small. This often involves difficulties upon turning off the water supply in disposing of the residual heat of the element without either producing large quantities of steam or reaching a temperature liable to damage the element or other parts of the unit.

According to the present invention water from the supply flows in succession through a primary path of a heat exchanger over a heating element and through a secondary path of the heat-exchanger to an outlet.

During normal flow when water is being drawn off some heat exchange occurs but when the water supply is cut off and the flow stopped some steam is generated by the rapid rise of temperature due to residual heat of the element and passes over into the heat-exchanger where it is condensed, greatly increasing the rate of heat transfer to the water contained in the primary path. The resulting expansion of the water in the primary path, assisted by a syphon effect when the hot water outlet of the unit is at the lowermost point in the water circulator system of the unit, expels water from the heat-exchanger and causes it to flow over and cool the heating element.

A pressure-operated switch is preferably provided, connected to or interposed in the supply pipe between a control valve regulating the flow and the primary of the heat-exchanger and is arranged to switch on the immersion heater when flow reaches a pre-determined minimum value and to switch it off again when the flow falls below this value. The pressure-operated switch is preferably adjusted so that the rate of flow at which it opens is such that boiling water is produced at the outlet as soon as equilibrium is reached.

The flow of water from the supply to the heater preferably passes through the pressure-operated switch so that the water in the switch is continuously changed and does not become stale. The pressure-operated switch preferably comprises an inlet port open to the supply, an outlet port open to the heater, and a pressure-responsive element, for actuating the contacts, which is displaceable according to the pressure existing between the inlet and outlet ports.

When the control valve is shut the contacts of the pressure-operated switch open to disconnect the heating element from the electrical supply. To reduce the risk that pressure generated in the heater by residual heat may actuate the pressure-operated switch the supply pipe between the switch and the primary path of the heat exchanger is preferably smaller in bore diameter than the further pipes through which the water passes to the outlet, or is otherwise restricted.

An embodiment of the invention will now be described with reference to the accompanying drawings in which:

Figure 1 is a front elevation of a heater according to the invention with part of the cover broken away to reveal the interior.

Figure 2 is a side elevation with part of the front cover broken away to reveal the interior.

Figure 3 is a vertical section on an enlarged scale of a pressure-operated switch appearing at the top of Figure 1.

Figure 4 is a top plan view of the switch assembly of Figure 3 on a smaller scale.

The heating unit has a circular mounting plate 10 having holes 9 for fixing screws (not shown) by which it can be secured in an upright position and is provided with a detachable cover 11.

The water supply is connected by a pipe 12 through a needle control valve 13 to a pressure-operated switch 14 at the highest point in the unit. From the pressure-sensitive switch 14 a pipe 15 leads to a primary path of a heat-exchanger 16 from which a pipe 17 leads to a lower heating chamber 18. A short connection 19 connects the top of the lower heating chamber 18 to the bottom of an upper heating chamber 20. An outlet pipe 21 leads from the top of the upper heating chamber 20 through a trap 22 and the heat exchanger 16, of which it forms a secondary path, to a swivel pipe 23 forming the hot water outlet of the unit.

The needle control valve 13 has a spindle which projects through an opening in the cover 11 and is fitted with a handwheel 24 which is the sole manually operable control of the heating unit. The size of the needle valve 13 is such that it enables low rates of flow to be readily obtained.

The pressure-operated switch has a body comprising a base 25 and a cover 26 bolted to it. The base has a central inlet port 27 and an outlet port 28 eccentrically placed and smaller than the inlet port. Around the inlet port 27 is a shallow annular recess into which the outlet port 28 opens. The circular chamber 29 formed mainly by this recess is closed by a flexible diaphragm 30 held in place by a circular rib 31 on the cover 26 pressing its peripheral portion into engagement with a circular recess 32 in the base 25. The cover has a shallow internal recess 33 concentric with the inlet port and a coaxial bore 34 in which a plunger 35 is slidably mounted. The plunger 35 has a flat disc-shaped head 36 which is able to move freely in the recess 33 and supports the diaphragm against fluid-pressure within the chamber 29. The recessed portions of the chamber form at all times a space below the diaphragm ensuring even pressure distribution across the face of the diaphragm and the flat head of the plunger.

Parallel arms 37 extend tangentially from the cover and have on their free arms upright brackets 38 on the upper end of which one end of a lever 40 is pivoted. An adjusting screw 41 is fitted in a tapped hole at the other end of the lever 40 and bears on the end of the plunger 35 protruding from the end of the bore 34. An upright post 42 secured to the cover passes through a large opening in the lever 40 and carries at its upper end a toroidal compression spring 43 which bears at the upper end on a nut 44 adjustable on a screw-thread on to the end of the post 42 and forming an adjustment for the spring pressure applied by the lower end to the lever on which it bears. Between the post 42 and the brackets 38 two micro-switches 45 are fitted side by side. Lateral arms 46 on the lever 40 bear on the operating plungers of the micro-switches 45.

The pipe 15 has a smaller bore than any of the further pipes through which the water passes to the outlet for a purpose to be referred to later.

The heat exchanger 16 comprises an outer tube 47 concentric with a horizontal portion 48 of the outlet pipe 21 and closed at the ends through which the outlet pipe 21 passes. Extending upwards from the outer tube 47 is a turret 52 closed by a plug which is removable for the insertion of descaling powder in hard-water areas. The annular space 49 between the pipes 21 and 47 forms the primary path of the heat exchanger. The pipe 15 is connected to the upper side of the space 49 near the end at which the outlet pipe 21 is connected to the upper heating chamber 20. To the underside of the opposite end of the primary space 49 one end of the pipe 17 is connected. Its other end extends axially inside the lower heating chamber 18 nearly to the left-hand end as seen in Figure 1. There are two heating chambers 18 and 20 largely as a matter of convenience in arranging the whole unit compactly. A single chamber could be employed if desired. Immersion heating elements 50 of the "embedded" helical type are employed. In the embodiment illustrated there are two pairs of such elements connected in parallel, each pair being connected through a micro-switch 45 to the supply. Two micro-switches 45 are employed as a matter of convenience, a single micro-switch of suitable capacity could be used. The micro-switches are connected internally of the heating unit by wiring (not shown) to a terminal block 55 to which the external supply lead (not shown) is also wired.

The short connection 19 connects the heating chambers 18 and 20 at their right-hand end, as seen in Figure 1. The outlet pipe 21 is connected to the left-hand end of the upper heating chamber 20. The trap 22 is provided with a removable inspection cover 51. The outlet pipe 21 is bent downwards at the end of its horizontal portion 48 and is joined to the swivel pipe 23 by a coupling 53. The inlet pipe 12 and the outlet pipe 21 are both secured to the base plate 10 by a fixing clamp 54 near the places at which they pass through the casing 11. The trap 22 provides a high point in the outlet pipe 21 which under normal conditions keeps the whole circulation system of the unit full of water. The hot-water outlet of the unit at the open end of the swivel pipe 23 is the lowest point in the water circulation system of the unit.

When the water supply is turned on at the needle control valve 13 pressure rises almost immediately in the inlet port 27 of the pressure-operated switch 14 to a value sufficient, even though acting upon the reduced area of the diaphragm exposed through the inlet port 27, to overcome the force of the spring 43 and displace the diaphragm from the inlet port. Water flows through the chamber 29 of the pressure-operated switch 14 and because of the restriction imposed by the outlet port 28 and the pipe 15 a rise of pressure proportional to the flow occurs in the chamber 29 and deflects the diaphragm 30 and plunger 35 and moves the lever 40. The force required to move the lever is determined by the adjustment of the spring 43, the movement of the lever 40 is proportional to the rate of flow and the point in the movement of the lever 40 and therefore the rate of flow at which the contacts of the micro-switches 45 are closed to energise the heating elements 50 is determined by the setting of the adjusting screw 41.

The build up of pressure in the inlet port 27 before the diaphragm is displaced assists in the rapid filling of the chamber 29 and a rapid rise in pressure which acting upon the full area of the diaphragm causes the plunger to move quickly and positively to operate the switch 45.

Water flows from left to right in the primary space 49 of the heat-exchanger and under equilibrium conditions is pre-heated in the heat-exchanger before entering the pipe 17 and is further heated as it passes through the portion of the pipe 17 within the lower heating chamber 18 before it enters that chamber. The water is rapidly heated by direct contact with the heating elements 50 reaching maximum temperature at the entrance to the pipe 21.

The heat input of the heating elements 50 is substantially constant and therefore the temperature to which the water is raised is inversely proportional to the rate of flow. The adjusting screw 43 is preferably set so that the contacts of the switches 45 close at the rate of flow which will produce boiling water at the hot-water output of the unit. At a lower rate which would produce a great deal of steam at the hot-water outlet if the heating elements were operative the current supply is cut off.

To obtain boiling water the control valve is opened slowly until the pressure-operated switch closes the electrical contacts. If desired an indicator lamp may be provided which lights when the contacts of the pressure-operated switch are closed. If water below boiling temperature is required the flow is increased; naturally the greater the flow of water the lower the temperature at the outlet since the heat input is constant.

Since water mains' pressure varies from one district to another and at different times of the day, the control valve setting for boiling rate may not always be the same but provided that the valve is opened until the indicator lamp lights the boiling rate of flow will be obtained.

In heating a stream of water rapidly to high temperature it is inevitable that some parts of the stream are heated more than others and when boiling water is required steam is generated at the more greatly heated parts within the heating chamber 20. The steam is largely condensed during the passage of the heat exchanger 16 resulting in a more uniform temperature of the water at the hot-water outlet, prevention of the emission of most of the steam and pre-heating of the water in the primary space of the heat exchanger.

When the needle control valve 13 is shut there is a drop in fluid pressure in the chamber 29 and the switches 45 are immediately operated to switch off the heaters 50 but there is considerable residual heat in the heating elements 50 which is given up to the water. The flow of hot water through the heating chamber does not stop instantly when the control valve 13 is shut off. Because the hot-water outlet is at the lowest point of the heating unit there is a syphon effect which tends to continue the flow temporarily. The rate of flow is very much reduced, however, and the surge of heat from the heating elements 50 causes the generation of considerable quantities of steam which pass into the heat-exchanger and are condensed, transferring heat to the water in the primary space 49 which expands and helps to continue the flow of water into the lower heating chamber 18 to assist in cooling the heating elements. The restriction of the small bore of the pipe 15 prevents any pressure developed in the heating chambers at this stage from operating the pressure-operated switch to close the contacts.

Because of the syphon effect previously mentioned the heat-exchanger 16 partly empties in spite of the fact that the top of the trap 22 is above the level of the heat-exchanger. The syphon effect is stopped by the combined effect of the low pressure induced in the free space of the heat-exchanger 16 and the increasing presence of air and steam in the column of water in the outlet pipe 21 which causes the flow. The outlet pipe 21 being of relatively large bore empties as far as the trap 22. It is found that the heat-exchanger empties to a greater extent when the control valve is shut off after the delivery of boiling water at the hot-water outlet than at lower temperatures. This is thought to be due to the fact that the water in the primary space 49 reaches a higher temperature and the resulting increase of water vapour pressure in the free space allows a greater expansion of the free space before a sufficiently low pressure is reached to stop the syphon effect.

At a lower delivery temperature the heating elements themselves are working at a lower temperature so that when the control valve is shut off there is less residual heat to dispose of. The water in the heating chamber is at a lower temperature and less steam is therefore generated. This in turn reduces the heat transfer in the heat-exchanger and the effects of expansion and vapour pressure of the water in the primary path of the heat-exchanger.

The partial emptying of the primary space of the heat-exchanger is most useful when the heating unit is next used in causing a slight time lag in the commencement of flow through the heating chamber while the primary space fills up. The time lag allows the heating elements to heat up more rapidly so that the desired water temperature is reached more quickly.

Although in the embodiment described the heating chambers 18 and 20 and the heat-exchanger 16 are horizontally disposed this is not essential and they may be arranged vertically. With the flat-ended cylindrical members shown such a vertical arrangement may simplify the making of the necessary pipe connections to these members. The connections may then all be made in the flat ends to which they may readily be soldered or brazed.

The heat-exchanger 16 is also shown in the illustrated embodiment at a higher level than the heating chambers 18 and 20 but this again is not essential. The heat-exchanger may be arranged at any convenient level above the lowermost point of the heating chambers. To ensure that the heat-exchanger and the heating chambers are normally kept full (apart from the syphon effect previously referred to) it is desirable that the outlet pipe 21 includes a portion equivalent to the trap 22 rising above the level of the top of the heating chambers or heat-exchanger whichever is the higher.

I claim:

1. A water heater comprising in combination a water inlet, a heating chamber including an electric heating element, a heat-exchanger including a primary and secondary path, a hot-water outlet and electric switch means for connecting the electric heating element to an electric supply solely while water is being drawn off at the hot-water outlet, the water inlet being connected to the heating chamber through the primary path of the heat-exchanger and the heating chamber being connected to the hot-water outlet through the secondary path of the heat-exchanger.

2. A water heater comprising in combination a water inlet, a hand-operated control valve, a fluid-pressure operated switch, a heating chamber including an electric heating element, an electric supply load connected to said heating element through said fluid-pressure operated switch, a heat-exchanger including a primary and a secondary path, and a hot-water outlet, the water inlet being connected to the heating chamber through said control valve and the primary path of the heat-exchanger, the heating chamber being connected to the hot-water outlet through the secondary path of the heat-exchanger, and the fluid-pressure operated switch being subject to the pressure existing between said control valve and said heating chamber.

3. A water heater comprising in combination a water inlet, a hand-operated flow control valve, a fluid-pressure opertaed switch including electrical contacts, a pressure chamber with an inlet port and an outlet port smaller than the inlet port, the water-containing cavity of said chamber being contained entirely in the water flow path between said inlet and outlet ports and a contact actuating pressure-responsive element exposed to pressure within the pressure chamber and adapted to close said contacts upon rise in pressure above a predetermined minimum value and to open said contacts upon a fall below said predetermined minimum value, a heating chamber including an electric heating element, an electric supply lead connected to said heating element through said electrical contacts, a heat-exchanger including a primary and secondary path, and a hot-water outlet, the water inlet being connected to said inlet port through said control valve, said outlet port being connected to said heating chamber through the primary path of said heat-exchanger and the heating chamber being connected to the hot-water outlet through the secondary path of the heat exchanger.

4. A water heater according to claim 3 wherein the pressure-responsive element closes the inlet port but is displaceable by an initial rise in pressure in the inlet port upon opening the control valve.

5. A water heater according to claim 3 wherein the minimum flow at which the switch contacts are closed is substantially that at which boiling water is produced at the outlet.

6. A water heater comprising in combination a water inlet, a hand-operated flow control valve, a water-flow operated electric switch, a heating chamber including an electric heating element, an electric supply lead connected to said housing element through said electric switch, a heat-exchanger including a primary and a secondary path in heat transferring relation, a water trap and a hot-water outlet, the water inlet being connected to the heating chamber through said flow control valve and said primary path, the heating chamber being connected in succession through said trap and said secondary path to said hot-water outlet, said trap having a portion at a higher level than the heating element.

7. A water heater according to claim 6 wherein the outlet is the lowest point in the water circuit of the heater.

8. A water heater according to claim 3 there being a passage connecting said outlet port to said primary path which is more restricted than the further passages through which the water flows to the outlet.

9. A water heater according to claim 2 wherein the heat-exchanger comprises a pair of concentric tubes the inner tube forming part of the outlet pipe and the outer tube being closed at the ends through which the inner tube projects, the annular space between the outer nad inner tubes forming the primary path of the heat-exchanger and the bore of the inner tube the secondary path and the connections of the heat exchanger in the heater being so made that water flow in the primary and secondary paths is parallel and in the same direction.

10. A water heater according to claim 3 wherein the pressure-operated switch comprises a shallow circular chamber which is closed by a flexible diaphragm and its inlet port is central and its outlet port eccentrically placed, a plunger slidable axially of the inlet port having a disc-shaped head normally urged by the resilient means into the chamber but being displaceable by fluid pressure within the chamber to close the electrical contacts when the predetermined minimum pressure is exceeded.

11. A water heater according to claim 10 wherein the fluid-pressure operated switch includes a pivoted lever adapted to actuate said contacts and being urged to rock in one direction to open said contacts by spring pressure and in the opposite direction to close said contacts by movement of the plunger.

12. A water heater according to claim 11 wherein means is provided for varying the point in the displacement of the plunger at which the switch contacts are closed.

13. A water heater according to claim 12 wherein means is provided for adjusting the force applied by the resilient means.

14. A water heater comprising in combination a water inlet and a water outlet, electrical means for heating water passing through said heater from said inlet to said outlet, means for connecting said heating means to means for condensing steam generated by said heating means and means for transferring the heat released by condensing such steam to water entering the heater.

References Cited in the file of this patent

UNITED STATES PATENTS

| | | |
|---|---|---|
| 1,554,502 | Hulse | Sept. 22, 1925 |
| 1,766,480 | Blauvelt | June 24, 1930 |
| 1,825,793 | Heroy | Oct. 6, 1931 |
| 2,036,117 | Cante | Mar. 31, 1936 |